United States Patent [19]

Elam et al.

[11] 3,821,711

[45] June 28, 1974

[54] SELF ADAPTIVE COMPRESSION AND EXPANSION APPARATUS FOR CHANGING THE LENGTH OF DIGITAL INFORMATION

[75] Inventors: Robert Runyon Elam, Manassas, Va.; Ralph Marc Heller, Gaithersburg; Eugen Igor Muehldorf, Potomac, both of Md.

[73] Assignee: International Business Machines Corporation, Armonk, N.Y.

[22] Filed: Dec. 26, 1972

[21] Appl. No.: 318,330

[52] U.S. Cl. ............................. 340/172.5, 235/154

[51] Int. Cl. ............................................ G06f 5/00

[58] Field of Search .................. 340/172.5; 235/154; 179/15.55 R, 15.55 T

[56] References Cited

UNITED STATES PATENTS

| | | | |
|---|---|---|---|
| 3,237,170 | 2/1966 | Blasbalg et al. | 340/172.5 |
| 3,432,811 | 3/1969 | Rwaldi et al. | 340/172.5 |
| 3,490,690 | 1/1970 | Apple et al. | 235/154 |
| 3,594,560 | 7/1971 | Stanley | 235/154 |
| 3,613,087 | 10/1971 | Brown et al. | 340/172.5 |
| 3,651,483 | 3/1972 | Clark et al. | 340/172.5 |
| 3,675,212 | 7/1972 | Raviv et al. | 340/172.5 |
| 3,694,813 | 9/1972 | Loh et al. | 340/172.5 |
| 3,717,851 | 2/1973 | Cocke et al. | 340/172.5 |

*Primary Examiner*—Paul J. Henon
*Assistant Examiner*—James D. Thomas
*Attorney, Agent, or Firm*—Joseph C. Redmond, Jr.

[57] ABSTRACT

Digital information, defined by a sequence S, is compressed by a Synthesis Generator, Counter and Timing Circuits into a plurality of blocks of digital data, one block defining an initial loading vector L, a second block defining a connective vector C and a third block defining a length count *n*, , the sum of the lengths of the digital data in the blocks being less than the length of the sequence S they represent. A linear feedback shift register of R stages where R is a limit stop or an integer is selected for optimum processing of the first, second and third blocks into the sequence S. Source means provide the linear feedback shift register a first, second and third source signals defining the loading vector L, the connective vector C and the length count *n*, respectively. Timing, counting and control means provide further signals to the linear feedback shift register to adaptively expand or reconstruct the sequence S from the first, second and third source signals.

10 Claims, 12 Drawing Figures

COMPACTED BLOCK

FIG. 5B

BLOCK 1 (START AT a UP TO b)

| $S_0$ | $S_1$ | $S_2$ | $S_3$ | $S_4$ | $C_0$ | $C_1$ | $C_2$ | $C_3$ | $C_4$ | $C_5$ | | | n | | | |
|---|---|---|---|---|---|---|---|---|---|---|---|---|---|---|---|---|
| 1 | 1 | 1 | 1 | 1 | 1 | 0 | 1 | 0 | 0 | 1 | 1 | 0 | 0 | 1 | 1 | 0 |

BLOCK 2 (START AT b UP TO c)

| $S_0$ | $S_1$ | $S_2$ | $S_3$ | $S_4$ | $C_0$ | $C_1$ | $C_2$ | $C_3$ | $C_4$ | $C_5$ | | | n | | | |
|---|---|---|---|---|---|---|---|---|---|---|---|---|---|---|---|---|
| 0 | 1 | 1 | 0 | 1 | 1 | 0 | 0 | 1 | 0 | 1 | 0 | 1 | 1 | 1 | 1 | 0 |

BLOCK 3 (START AT c UP TO d)

| $S_0$ | $S_1$ | $S_2$ | $S_3$ | $S_4$ | $C_0$ | $C_1$ | $C_2$ | $C_3$ | $C_4$ | $C_5$ | | | n | | | |
|---|---|---|---|---|---|---|---|---|---|---|---|---|---|---|---|---|
| 1 | 1 | 0 | 0 | 1 | 1 | 1 | 1 | 0 | 1 | 1 | 1 | 0 | 0 | 0 | 0 | 0 |

BLOCK 4 (START AT d UP TO e)

| $S_0$ | $S_1$ | $S_2$ | $S_3$ | $S_4$ | $C_0$ | $C_1$ | $C_2$ | $C_3$ | $C_4$ | $C_5$ | | | n | | | |
|---|---|---|---|---|---|---|---|---|---|---|---|---|---|---|---|---|
| 0 | 0 | 0 | 1 | 0 | 1 | 1 | 0 | 1 | 1 | 1 | 0 | 1 | 1 | 0 | 0 | 1 |

BLOCK 5 (START AT e UP TO f)

| | $S_0$ | $S_1$ | $S_2$ | $S_3$ | | $C_0$ | $C_1$ | $C_2$ | $C_3$ | $C_4$ | | | n | | | |
|---|---|---|---|---|---|---|---|---|---|---|---|---|---|---|---|---|
| 0 | 0 | 1 | 0 | 1 | 0 | 1 | 1 | 0 | 0 | 0 | 0 | 1 | 0 | 0 | 1 | 1 |

BLOCK 6 (START AT f UP TO g)

| $S_0$ | $S_1$ | $S_2$ | $S_3$ | $S_4$ | $C_0$ | $C_1$ | $C_2$ | $C_3$ | $C_4$ | $C_5$ | | | n | | | |
|---|---|---|---|---|---|---|---|---|---|---|---|---|---|---|---|---|
| 0 | 0 | 1 | 0 | 0 | 1 | 1 | 1 | 1 | 0 | 0 | 0 | 1 | 1 | 0 | 1 | 1 |

BLOCK 7 (START AT g UP TO h)

| | | $S_0$ | $S_1$ | $S_2$ | | | $C_0$ | $C_1$ | $C_2$ | $C_3$ | | | n | | | |
|---|---|---|---|---|---|---|---|---|---|---|---|---|---|---|---|---|
| 0 | 0 | 1 | 0 | 0 | 0 | 0 | 1 | 1 | 1 | 1 | 0 | 1 | 0 | 1 | 1 | 1 |

BLOCK 8 (START AT h UP TO i)

| | | $S_0$ | $S_1$ | $S_2$ | | | $C_0$ | $C_1$ | $C_2$ | $C_3$ | | | n | | | |
|---|---|---|---|---|---|---|---|---|---|---|---|---|---|---|---|---|
| 0 | 0 | 0 | 0 | 1 | 0 | 0 | 1 | 0 | 1 | 0 | 0 | 1 | 1 | 0 | 1 | 0 |

BLOCK 9 (START AT i UP TO j)

| $S_0$ | $S_1$ | $S_2$ | $S_3$ | $S_4$ | $C_0$ | $C_1$ | $C_2$ | $C_3$ | $C_4$ | $C_5$ | | | n | | | |
|---|---|---|---|---|---|---|---|---|---|---|---|---|---|---|---|---|
| 0 | 0 | 0 | 0 | 1 | 1 | 1 | 0 | 0 | 0 | 0 | 0 | 1 | 1 | 1 | 1 | 0 |

BLOCK 10 (START AT j UP TO END OF SEQUENCE)

| | $S_0$ | $S_1$ | $S_2$ | $S_3$ | | $C_0$ | $C_1$ | $C_2$ | $C_3$ | $C_4$ | | | n | | | |
|---|---|---|---|---|---|---|---|---|---|---|---|---|---|---|---|---|
| 0 | 0 | 0 | 0 | 1 | 0 | 1 | 1 | 0 | 0 | 0 | 1 | 1 | 0 | 0 | 1 | 0 |

FIG. 6D

| FIG. 6B | FIG. 6C | FIG. 6D |
|---|---|---|

FIG. 6A

| n-COUNTER 13 | | | | | | GATING BIT COUNTER 129 | DISCREPANCY | OVERFLOW CONTROL | CTRL XFER | COUNT OF BITS AS COMPACTED(n) |
|---|---|---|---|---|---|---|---|---|---|---|
| 1 | 1 | 1 | 1 | 1 | 1 | 0 | 0 | 0 | 1 | — |
| 0 | 0 | 0 | 0 | 0 | 0 | 1 | 1 | 0 | 1 | 0 |
| 0 | 0 | 0 | 0 | 0 | 1 | 2 | 0 | 0 | 1 | 1 |
| 0 | 0 | 0 | 0 | 1 | 0 | 3 | 0 | 0 | 1 | 2 |
| 0 | 0 | 0 | 0 | 1 | 1 | 4 | 0 | 0 | 1 | 3 |
| 0 | 0 | 0 | 1 | 0 | 0 | 5 | 0 | 0 | 1 | 4 |
| 0 | 0 | 0 | 1 | 0 | 1 | 5 | 1 | 0 | 1 | 5 |
| 0 | 0 | 0 | 1 | 1 | 0 | 5 | 1 | 0 | 1 | 6 |
| 0 | 0 | 0 | 1 | 1 | 1 | 5 | 0 | 0 | 1 | 7 |
| 0 | 0 | 1 | 0 | 0 | 0 | 5 | 0 | 0 | 1 | 8 |
| 0 | 0 | 1 | 0 | 0 | 1 | 5 | 0 | 1 | 1 | 9 |
| 0 | 0 | 1 | 0 | 1 | 0 | 5 | 0 | 1 | 1 | 0 |
| | | | | | | | | | | ↓ |
| 1 | 0 | 0 | 1 | 0 | 1 | 5 | 0 | 0 | 1 | 37 |
| 1 | 0 | 0 | 1 | 1 | 0 | 5 | 1 | 0 | 0 | 38 |
| 1 | 1 | 1 | 1 | 1 | 1 | 0 | 0 | 0 | 1 | — |
| 0 | 0 | 0 | 0 | 0 | 0 | 1 | 0 | 0 | 1 | 0 |
| 0 | 0 | 0 | 0 | 0 | 1 | 2 | 1 | 0 | 1 | 1 |
| 0 | 0 | 0 | 0 | 1 | 0 | 3 | 0 | 0 | 1 | 2 |
| 0 | 0 | 0 | 0 | 1 | 1 | 4 | 0 | 0 | 1 | 3 |
| 0 | 0 | 0 | 1 | 0 | 0 | 5 | 0 | 0 | 1 | 4 |
| 0 | 0 | 0 | 1 | 0 | 1 | 5 | 0 | 0 | 1 | 5 |
| 0 | 0 | 0 | 1 | 1 | 0 | 5 | 1 | 0 | 1 | 6 |
| 0 | 0 | 0 | 1 | 1 | 1 | 5 | 1 | 0 | 1 | 7 |
| 0 | 0 | 1 | 0 | 0 | 0 | 5 | 0 | 0 | 1 | 8 |
| 0 | 0 | 1 | 0 | 0 | 1 | 5 | 0 | 1 | 1 | 9 |
| | | | | | | | | | | ↓ |
| 0 | 1 | 1 | 1 | 0 | 1 | 5 | 0 | 0 | 1 | 29 |
| 0 | 1 | 1 | 1 | 1 | 0 | 5 | 1 | 0 | 0 | 30 |
| 1 | 1 | 1 | 1 | 1 | 1 | 0 | 0 | 0 | 1 | — |
| 0 | 0 | 0 | 0 | 0 | 0 | 1 | 1 | 0 | 1 | 0 |
| 0 | 0 | 0 | 0 | 0 | 1 | 2 | 1 | 0 | 1 | 1 |
| 0 | 0 | 0 | 0 | 1 | 0 | 3 | 0 | 0 | 1 | 2 |
| 0 | 0 | 0 | 0 | 1 | 1 | 4 | 1 | 0 | 1 | 3 |
| 0 | 0 | 0 | 1 | 0 | 0 | 5 | 1 | 0 | 1 | 4 |
| 0 | 0 | 0 | 1 | 0 | 1 | 5 | 1 | 0 | 1 | 5 |

FIG. 6B (SWITCH 133 CLOSED FOR THIS POSITION) — B6

| | | REGISTER 125 | | | | | | INACTIVE | | REGISTER 117 | | | | | | INACTIVE | | |
|---|---|---|---|---|---|---|---|---|---|---|---|---|---|---|---|---|---|---|
| STEP | CYCLE | B1 | B2 | B3 | B4 | B5 | B6 | B7 | B8 | C0 | C1 | C2 | C3 | C4 | C5 | C6 | C7 | C8 |
| R | 1 | 1 | 0 | 0 | 0 | 0 | 0 | 0 | 0 | 1 | 0 | 0 | 0 | 0 | 0 | 0 | 0 | 0 |
| 1 | 1 | 1 | 0 | 0 | 0 | 0 | 0 | 0 | 0 | 1 | 1 | 0 | 0 | 0 | 0 | 0 | 0 | 0 |
| 2 | 1 | 0 | 1 | 0 | 0 | 0 | 0 | 0 | 0 | 1 | 1 | 0 | 0 | 0 | 0 | 0 | 0 | 0 |
| 3 | 1 | 0 | 0 | 1 | 0 | 0 | 0 | 0 | 0 | 1 | 1 | 0 | 0 | 0 | 0 | 0 | 0 | 0 |
| 4 | 1 | 0 | 0 | 0 | 1 | 0 | 0 | 0 | 0 | 1 | 1 | 0 | 0 | 0 | 0 | 0 | 0 | 0 |
| 5 | 1 | 0 | 0 | 0 | 0 | 1 | 0 | 0 | 0 | 1 | 1 | 0 | 0 | 0 | 0 | 0 | 0 | 0 |
| 6 | 1 | 1 | 1 | 0 | 0 | 0 | 0 | 0 | 0 | 1 | 1 | 0 | 0 | 0 | 1 | 0 | 0 | 0 |
| 7 | 1 | 0 | 1 | 1 | 0 | 0 | 0 | 0 | 0 | 1 | 0 | 1 | 0 | 0 | 1 | 0 | 0 | 0 |
| 8 | 1 | 0 | 0 | 1 | 1 | 0 | 0 | 0 | 0 | 1 | 0 | 1 | 0 | 0 | 1 | 0 | 0 | 0 |
| 9 | 1 | 0 | 0 | 0 | 1 | 0 | 0 | 0 | 0 | 1 | 0 | 1 | 0 | 0 | 1 | 0 | 0 | 0 |
| 10 | 1 | 0 | 0 | 0 | 0 | 1 | 1 | 0 | 0 | 1 | 0 | 1 | 0 | 0 | 1 | 0 | 0 | 0 |
| 11 | 1 | 0 | 0 | 0 | 0 | 0 | 1 | 1 | 0 | 1 | 0 | 1 | 0 | 0 | 1 | 0 | 0 | 0 |
| ↓ | | | | | | | | | | | | | | | | | | |
| 38 | 1 | 0 | 0 | 0 | 0 | 0 | 0 | 0 | 0 | 1 | 0 | 1 | 0 | 0 | 1 | 0 | 0 | 0 |
| 39 | 1 | 0 | 0 | 0 | 0 | 0 | 0 | 0 | 0 | 1 | 0 | 1 | 0 | 0 | 1 | 0 | 0 | 0 |
| R | 2 | 1 | 0 | 0 | 0 | 0 | 0 | 0 | 0 | 1 | 0 | 0 | 0 | 0 | 0 | 0 | 0 | 0 |
| 1 | 2 | 0 | 1 | 0 | 0 | 0 | 0 | 0 | 0 | 1 | 0 | 0 | 0 | 0 | 0 | 0 | 0 | 0 |
| 2 | 2 | 1 | 0 | 0 | 0 | 0 | 0 | 0 | 0 | 1 | 0 | 1 | 0 | 0 | 0 | 0 | 0 | 0 |
| 3 | 2 | 0 | 1 | 0 | 0 | 0 | 0 | 0 | 0 | 1 | 1 | 1 | 0 | 0 | 0 | 0 | 0 | 0 |
| 4 | 2 | 0 | 0 | 1 | 0 | 0 | 0 | 0 | 0 | 1 | 1 | 1 | 0 | 0 | 0 | 0 | 0 | 0 |
| 5 | 2 | 0 | 0 | 0 | 1 | 0 | 0 | 0 | 0 | 1 | 1 | 1 | 0 | 0 | 0 | 0 | 0 | 0 |
| 6 | 2 | 0 | 0 | 0 | 0 | 1 | 0 | 0 | 0 | 1 | 1 | 1 | 0 | 0 | 0 | 0 | 0 | 0 |
| 7 | 2 | 1 | 1 | 1 | 0 | 0 | 0 | 0 | 0 | 1 | 1 | 1 | 0 | 0 | 1 | 0 | 0 | 0 |
| 8 | 2 | 0 | 1 | 1 | 1 | 0 | 0 | 0 | 0 | 1 | 0 | 0 | 1 | 0 | 1 | 0 | 0 | 0 |
| 9 | 2 | 0 | 0 | 1 | 1 | 1 | 0 | 0 | 0 | 1 | 0 | 0 | 1 | 0 | 1 | 0 | 0 | 0 |
| 10 | 2 | 0 | 0 | 0 | 1 | 1 | 1 | 0 | 0 | 1 | 0 | 0 | 1 | 0 | 1 | 0 | 0 | 0 |
| ↓ | | | | | | | | | | | | | | | | | | |
| 30 | 2 | 0 | 0 | 0 | 0 | 0 | 0 | 0 | 0 | 1 | 0 | 0 | 1 | 0 | 1 | 0 | 0 | 0 |
| 31 | 2 | 0 | 0 | 0 | 0 | 0 | 0 | 0 | 0 | 1 | 0 | 0 | 1 | 0 | 1 | 0 | 0 | 0 |
| R | 7 | 1 | 0 | 0 | 0 | 0 | 0 | 0 | 0 | 1 | 0 | 0 | 0 | 0 | 0 | 0 | 0 | 0 |
| 1 | 7 | 1 | 0 | 0 | 0 | 0 | 0 | 0 | 0 | 1 | 1 | 0 | 0 | 0 | 0 | 0 | 0 | 0 |
| 2 | 7 | 0 | 1 | 0 | 0 | 0 | 0 | 0 | 0 | 1 | 0 | 0 | 0 | 0 | 0 | 0 | 0 | 0 |
| 3 | 7 | 0 | 0 | 1 | 0 | 0 | 0 | 0 | 0 | 1 | 0 | 0 | 0 | 0 | 0 | 0 | 0 | 0 |
| 4 | 7 | 1 | 0 | 0 | 0 | 0 | 0 | 0 | 0 | 1 | 0 | 0 | 1 | 0 | 0 | 0 | 0 | 0 |
| 5 | 7 | 0 | 1 | 0 | 0 | 0 | 0 | 0 | 0 | 1 | 1 | 0 | 1 | 0 | 0 | 0 | 0 | 0 |
| 6 | 7 | 0 | 0 | 1 | 0 | 0 | 0 | 0 | 0 | 1 | 1 | 1 | 1 | 0 | 0 | 0 | 0 | 0 |

FIG. 6C

| REGISTER 111 | | | | | | INACTIVE | | | INACTIVE | | | REGISTER 127 | | | | |
|---|---|---|---|---|---|---|---|---|---|---|---|---|---|---|---|---|
| $S_n$ | $S_{n-1}$ | $S_{n-2}$ | $S_{n-3}$ | $S_{n-4}$ | $S_{n-5}$ | $S_{n-6}$ | $S_{n-7}$ | $S_{n-8}$ | $S_7$ | $S_6$ | $S_5$ | $S_4$ | $S_3$ | $S_2$ | $S_1$ | $S_0$ |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 1 |
| 1 | 1 | 0 | 0 | 0 | 0 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 0 | 0 | 1 | 1 | 1 |
| 1 | 1 | 1 | 1 | 0 | 0 | 0 | 0 | 0 | 0 | 0 | 0 | 0 | 1 | 1 | 1 | 1 |
| 1 | 1 | 1 | 1 | 1 | 0 | 0 | 0 | 0 | 0 | 0 | 0 | 1 | 1 | 1 | 1 | 1 |
| 0 | 1 | 1 | 1 | 1 | 1 | 0 | 0 | 0 | 0 | 0 | 0 | 1 | 1 | 1 | 1 | 1 |
| 0 | 0 | 1 | 1 | 1 | 1 | 1 | 0 | 0 | 0 | 0 | 0 | 1 | 1 | 1 | 1 | 1 |
| 1 | 0 | 0 | 1 | 1 | 1 | 1 | 1 | 0 | 0 | 0 | 0 | 1 | 1 | 1 | 1 | 1 |
| 1 | 1 | 0 | 0 | 1 | 1 | 1 | 1 | 1 | 0 | 0 | 0 | 1 | 1 | 1 | 1 | 1 |
| 0 | 1 | 1 | 0 | 0 | 1 | 1 | 1 | 1 | 0 | 0 | 0 | 1 | 1 | 1 | 1 | 1 |
| 1 | 0 | 1 | 1 | 0 | 0 | 1 | 1 | 1 | 0 | 0 | 0 | 1 | 1 | 1 | 1 | 1 |
| 0 | 0 | 1 | 1 | 1 | 1 | 1 | 0 | 0 | 0 | 0 | 0 | 1 | 1 | 1 | 1 | 1 |
| 0 | 0 | 0 | 1 | 1 | 1 | 1 | 1 | 0 | 0 | 0 | 0 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 1 | 0 |
| 1 | 1 | 0 | 0 | 0 | 0 | 0 | 0 | 0 | 0 | 0 | 0 | 0 | 0 | 1 | 1 | 0 |
| 0 | 1 | 1 | 0 | 0 | 0 | 0 | 0 | 0 | 0 | 0 | 0 | 0 | 0 | 1 | 1 | 0 |
| 1 | 0 | 1 | 1 | 0 | 0 | 0 | 0 | 0 | 0 | 0 | 0 | 1 | 0 | 1 | 1 | 0 |
| 1 | 1 | 0 | 1 | 1 | 0 | 0 | 0 | 0 | 0 | 0 | 0 | 1 | 0 | 1 | 1 | 0 |
| 1 | 1 | 1 | 0 | 1 | 1 | 0 | 0 | 0 | 0 | 0 | 0 | 1 | 0 | 1 | 1 | 0 |
| 0 | 1 | 1 | 1 | 0 | 1 | 1 | 0 | 0 | 0 | 0 | 0 | 1 | 0 | 1 | 1 | 0 |
| 1 | 0 | 1 | 1 | 1 | 0 | 1 | 1 | 0 | 0 | 0 | 0 | 1 | 0 | 1 | 1 | 0 |
| 0 | 1 | 0 | 1 | 1 | 1 | 0 | 1 | 1 | 0 | 0 | 0 | 1 | 0 | 1 | 1 | 0 |
| 0 | 1 | 1 | 1 | 1 | 1 | 0 | 0 | 1 | 0 | 0 | 0 | 0 | 1 | 1 | 0 | 1 |
| 1 | 0 | 1 | 1 | 1 | 1 | 1 | 0 | 0 | 0 | 0 | 0 | 0 | 1 | 1 | 0 | 1 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 1 |
| 0 | 1 | 0 | 0 | 0 | 0 | 0 | 0 | 0 | 0 | 0 | 0 | 0 | 0 | 0 | 0 | 1 |
| 1 | 0 | 0 | 1 | 0 | 0 | 0 | 0 | 0 | 0 | 0 | 0 | 0 | 0 | 0 | 0 | 1 |
| 1 | 1 | 0 | 0 | 1 | 0 | 0 | 0 | 0 | 0 | 0 | 0 | 0 | 1 | 0 | 0 | 1 |
| 0 | 1 | 1 | 0 | 0 | 1 | 0 | 0 | 0 | 0 | 0 | 0 | 1 | 1 | 0 | 0 | 1 |
| 0 | 0 | 1 | 1 | 0 | 0 | 1 | 0 | 0 | 0 | 0 | 0 | 1 | 1 | 0 | 1 | 1 |

FIG. 7A

REGISTER 210

INACTIVE: $T_1$–$T_3$

SEGMENT STARTING AT "a": $T_8$ / $S_0$

| STEP | $C_0$ $C_1$ $C_2$ $C_3$ $C_4$ $C_5$ $C_6$ $C_7$ $C_8$ | $T_1$ | $T_2$ | $T_3$ | $T_4$ $S_4$ | $T_5$ $S_3$ | $T_6$ $S_2$ | $T_7$ $S_1$ | $T_8$ $S_0$ | |
|---|---|---|---|---|---|---|---|---|---|---|
| 1 | CYCLE 1: | 0 | 0 | 0 | 1 | 1 | 1 | 1 | 1 | LOADING CONDITION |
| 2 | REGISTER 220 | 0 | 0 | 0 | 0 | 1 | 1 | 1 | 1 | CONTINUE SEQUENCE READOUT |
| 3 | 0 0 0 1 1 1 1 1 1 | 0 | 0 | 0 | 0 | 0 | 1 | 1 | 1 | |
| 4 | (DOES NOT CHANGE | 0 | 0 | 0 | 1 | 0 | 0 | 1 | 1 | |
| 5 | DURING CYCLE) | 0 | 0 | 0 | 1 | 1 | 0 | 0 | 1 | |
| 6 | REGISTER 250 | 0 | 0 | 0 | 0 | 1 | 1 | 0 | 0 | |
| 7 | 0 0 0 1 0 1 0 0 1 | 0 | 0 | 0 | 1 | 0 | 1 | 1 | 0 | |
| 8 | (DOES NOT CHANGE | 0 | 0 | 0 | 0 | 1 | 0 | 1 | 1 | |
| 9 | DURING CYCLE) | 0 | 0 | 0 | 0 | 0 | 1 | 0 | 1 | |
| 10 | | 0 | 0 | 0 | 1 | 0 | 0 | 1 | 0 | |
| 11 | | 0 | 0 | 0 | 0 | 1 | 0 | 0 | 1 | |
| 12 | | 0 | 0 | 0 | 0 | 0 | 1 | 0 | 0 | |
| 13 | | 0 | 0 | 0 | 0 | 0 | 0 | 1 | 0 | |
| 14 | | 0 | 0 | 0 | 0 | 0 | 0 | 0 | 1 | |
| 15 | | 0 | 0 | 0 | 1 | 0 | 0 | 0 | 0 | |
| 16 | | 0 | 0 | 0 | • | 1 | 0 | 0 | 0 | |
| 17 | | 0 | 0 | 0 | • | • | 1 | 0 | 0 | |
| 18 | | 0 | 0 | 0 | • | • | • | 1 | 0 | |
| 19 | | 0 | 0 | 0 | • | • | • | • | 1 | |
| ⋮ | | | | | | | | | | |
| 32 | | 0 | 0 | 0 | 1 | 1 | 1 | 1 | 1 | |
| 33 | | 0 | 0 | 0 | 0 | 1 | 1 | 1 | 1 | |
| 34 | | 0 | 0 | 0 | 0 | 0 | 1 | 1 | 1 | |
| 35 | | 0 | 0 | 0 | 1 | 0 | 0 | 1 | 1 | |
| 36 | | 0 | 0 | 0 | 1 | 1 | 0 | 0 | 1 | |
| 37 | | 0 | 0 | 0 | 0 | 1 | 1 | 0 | 0 | |
| 38 | | 0 | 0 | 0 | 1 | 0 | 1 | 1 | 0 | STOP SEQUENCE READOUT |
| RESET | | 0 | 0 | 0 | 0 | 0 | 0 | 0 | 0 | |

SELF ADAPTIVE COMPRESSION AND EXPANSION APPARATUS FOR CHANGING THE LENGTH OF DIGITAL INFORMATION

BACKGROUND OF THE INVENTION:

1. Field of the Invention

The invention is directed to data compression and/or data expansion. More particularly, the method and apparatus of this invention is related to digital data conversion calculators or registers; electrical communications error checking systems, electrical code converters and electrical testing, e.g. large scale integrated circuits.

2. Description of the Prior Art

The two basic data compression techniques which are generally described in the prior art are predictive compression and adaptive compression. Predictive compression removes redundancies by exploiting a prior known message statistics. Adaptive compression monitors the message statistics and adaptively modifies the coding in accordance therewith.

Predictive compression requires that higher order message statistics, which are expensive to collect, be known. Furthermore most compression schemes such as run length encoding or Shannon-Fano encoding, only work efficiently when the message statistics do not change. If the message statistics do change, the compaction becomes inefficient and the coding often expands the message rather than compacting it.

Adaptive compression on the other hand requires a sizeable amount of apparatus for its implementation such as message probability distribution analyzers, prediction function generators as well as entropy and decision computers. Adaptive compaction may also result in actual expansion of the information because the information source statistics may not be measurable to the required precision.

For these reasons, methods used in actual practice seek a middle ground method that (a) requires only simple apparatus, and (b) compresses reaonsably well for different kinds of message sources.

It is suggested that linear feedback shift register (LFSR) sequence generators may be adapted to compression thereby achieving the sought after middle ground method. In "Shift Register Synthesis and BCH Decoding," IEEE Transactions on Information Theory, Vol. IT-15, No. 1, Jan. 1969, J. L. Massey shows that a unique minimum length linear feedback shift register, (LFSR), can be found for any one-zero sequence (S) of length *j*. The LFSR that is capable of reproducing the sequence S, is specified by an initial loading vector L of length *r* plus a connective vector C. Vector C is the coefficients of a connective polynomial $C(D) = C_0+C_1+D+C_2D^2+...+C_rD^r$, where $C_0$ is always 1 and $C_1...C_r$ can be either 0 or 1 and D is a variable. Therefore the connective vector C, although being $r+1$ bits in length, can be specified by *r* variable bits. Practical use of LFSR compression is severely limited by the fact that for long sequences (typically in excess of 1,000 bits) registers tend to require many stages which leads to impractical hardware for the usually encountered sequences.

SUMMARY OF THE INVENTION

It is an object of this invention to compact and expand information without the use of extensive apparatus.

It is a further object of this invention to compact and expand information having variable message statistic, as long as the messages show a piecewise linear structure.

It is an even further object of this invention to adaptively compact and expand information using a variable length linear feedback shift register which can be limited to a maximum length RMAX resulting in practical hardware (typically 30 stages).

These and further objects will become apparent upon a reading of the specification and drawings. A data message with linear structure is one that can be generated by a feedback shift register as described in the text "Shift Register Sequences" by S. W. Golomb, published by Holden-Day, Inc., San Francisco, Calif., 1967, pg. 28. In one form of the invention, a piecewise linear structure data message is compacted and/or expanded in a manner related to the principles of the Massey article, supra. For such messages an optimum processing length or limit stop R can be calculated from the message statistic.

When it is desired to repeatedly compact and expand piecewise linear messages coming from the same source, R can be determined by recurrently executing on the same sequence the Massey algorithm for various limit stops and selecting the limit stop R for best compaction.

The limit stop calculation steps monitor thhe compression process for each linear message portion until a portion of the original sequence S is compressed into a loading vector L and a connective vector C having lengths *r* which is less than or equal the limit stop R, which is in turn less or equal to the maximum available number of shift register stages RMAX. Compression is then temporarily halted and the vectors L and C and a count *n* of the number of bits of S which have been compressed are recognized as the compressed equivalent of the first *n* bits of the sequence S. The compression process is then restarted to compress additional portions of the remaining bits of the sequence S.

Expansion is accomplished by loading the initial loading vector L into a LFSR and connecting the feedback paths in accordance with the bit pattern of the connective vector C. The LFSR is then shifted *n* times to recreate the *n* bits of the original sequence S.

BRIEF DESCRIPTION OF THE DRAWINGS

FIG. 5B is a representation of the compacted data for sequence S of FIG. 5A.

FIG. 6A is an assembly drawing of FIG. 6B, C and D.

FIGS. 6B, C and D show data contents of various registers and counters in the apparatus of FIG. 2 during compaction.

A PREFERRED EMBODIMENT OF THE INVENTION

Figure 4:
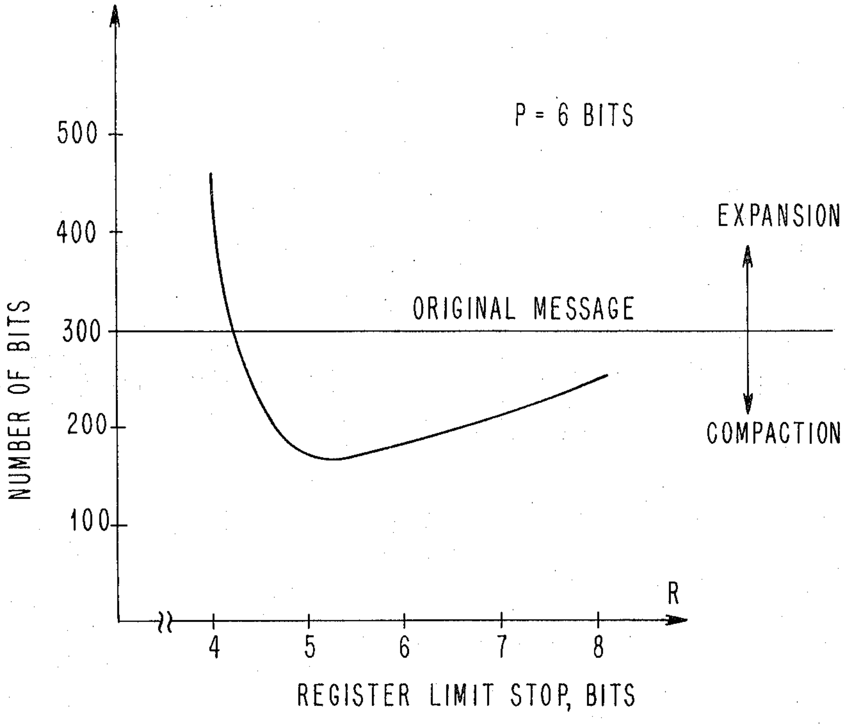
FIG. 4 is a graph showing compaction efficiency for a particular type of message by plotting the number of bits compacted into each block as a function of register bit length limit stop R with counter length P held constant at 6 bits.

Referring now to the list of steps set out below, a preferred embodiment of the method of compaction of the invention is set forth. In order to allow the use of simple linear feedback shift register apparatus for expansion, the method of the invention subdivides an original $j$ bit sequence S into sequences of $n = 2P$ or less bits. The compaction process forms an initial loading vector L of $r$ bits, with $r$ being less or equal to R bits, where R is the limit stop. The value of R is chosen in advance and is based upon message statistics. An example characterising the message in a manner suitable for the disclosed compaction method is shown in FIG. 4, to be described hereafter. The algorithm for accomplishing the compression process according to the invention is described in Table 1. It is related to the Berlekamp iterative algorithm as described in the Massey article, supra. The steps of the method of compression put forth in this invention are labeled from 1 to 13. The length of the sequence S is $j$ bits. The expression C(D) corresponds to the connective polynominal described previously and in the Massey algorithm. The expression B(D) is the connective polynominal from the previous compaction step as described in the Berlekamp algorithm. Likewise, variables $x$, $b$, $r$ and $n$ correspond to the variables of the iterative algorithm. The variable $d$ is the discrepancy, which is used to determine whether the connective polynominal C(D) must be changed in order to describe the sequence S up to the $n$-th bit. The variable i is a summation variable. The variable P is the number of bits used to express the length $n$ of the portion of the sequence S being compresssed in one block.

TABLE 1

| | |
|---|---|
| 1 | If $0<j<R$ go to 13<br>If $j>R$ go to 2<br>If $j=0$ stop |
| 2 | $C(D)\leftarrow 1$  $B(D)\leftarrow 1$  $x\leftarrow 1$  $r\leftarrow 0$  $n\leftarrow 0$ |
| 3 | If $n=j$ go to 12<br>If $n\neq j$ go to 4 |
| 4 | Compute<br>$d=S_n+\sum_{i=1}^{r} C_i S_{n-i}$ |
| 5 | If $d=0$ then $x\leftarrow x+1$ and go to 10<br>If $d\neq 0$ go to 6 |
| 6 | If $2r>n$ go to 7<br>If $2r\leq n$ go to 8 |
| 7 | $C(D)=C(D)\oplus dD^x B(D)$<br>$x\leftarrow x+1$ go to 10 |
| 8 | $T(D)\leftarrow C(D)$<br>$C(D)\leftarrow C(D)\oplus dD^x B(D)$<br>$B(D)\leftarrow T(D)$<br>$r\leftarrow n+1-r$<br>$x\leftarrow 1$ |
| 9 | If $r\leq R$ go to 10<br>If $r>R$ go to 11 |

Table 1 – Continued

| | |
|---|---|
| 10 | If $n<2^P n\leftarrow n+1$ and go to 3<br>If $n=2^P$ go to 12 |
| 11 | $C(D)\leftarrow B(D)$<br>$r\leftarrow n+1-r$ |
| 12 | Form the triplet:<br>$n$; $L\leftarrow S_0, S_1, \ldots S_{r-1}$; C<br>Remove $S_{n-1}, \ldots S_1, S_0$ from Sequence S, then go to 1 |
| 13 | $n\leftarrow j$<br>$C(D)\leftarrow 0, 0, \ldots 0$<br>$L\leftarrow S_0, S_1, \ldots S_j$<br>Form triplet $n$; L; C<br>Remove $S_j \ldots S_0$ from S and go to 1 |

Briefly, this algorithm accomplishes the following: Step 1 is a routing statement including a check to determine when the sequence is exhausted. Step 2 initiates the Massey Berlekamp algorithm. In step 3 it is checked, whether all iterations of one cycle have exhausted the sequence. The discrepancy is computed in step 4; step 5 routes for discrepancy 1 or 0. Step 6 checks for conditions (a) (no length change) and (b) (length change); the actual changes are accomplished in step 7 (connective change only) and step 8 (connective and length change). Step 9 is the limit stop, which distinguishes this algorithm from the Massey-Berlekamp algorithm. If $r$ R the Massey-Berlekamp algorithm is continued through step 10. If $R<r$ the last length change is "undone" in step 11; and finishes one cycle of compaction. The compaction format is derived in step 12, upon which the sequence is reduced and the algorithm restarted for another cycle. Step 13 is a safety check for sequences too short for compaction.

The limit stop will stop the compaction and divide it into several cycles. Each cycle will produce compacted data of equal length, which make the algorithm described here useful for data compaction. In this manner reasonable hardward of limited size can be used for compaction and decompaction whereas the Massey-Berlekamp algorithm does not limit the hardware to a given size.

Figure 5A:
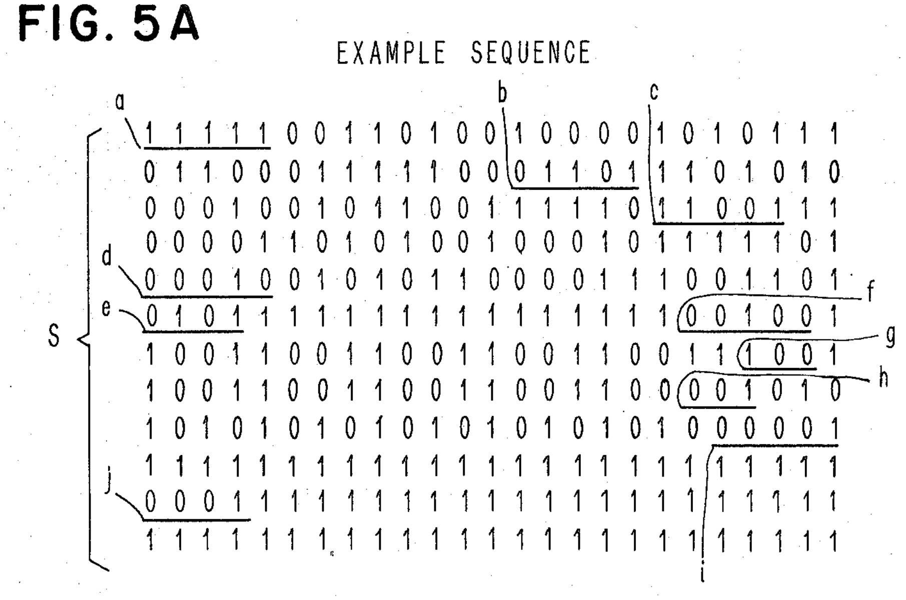
FIG. 5A is a representation of a typical data sequence (S) supplied as an input to the apparatus of FIG. 1.

FIG. 4 is generated by exercising the algorithm of Table 1 for the message shown in FIG. 5A using various limit stops R, keeping P=6 bits. The resulting number of bits necessary to describe the sequence S are plotted versus R. FIG. 4 shows the highest compaction efficiency for the algorithm of Table 1 is obtained with R chosen at 5. Other sequences may produce different message statistics. However, for the purposes of explaining the compaction process the curve shown in FIG. 4 can be considered to be typical of similar sequences.

COMPACTION AND DECOMPACTION APPARATUS

Figure 1:
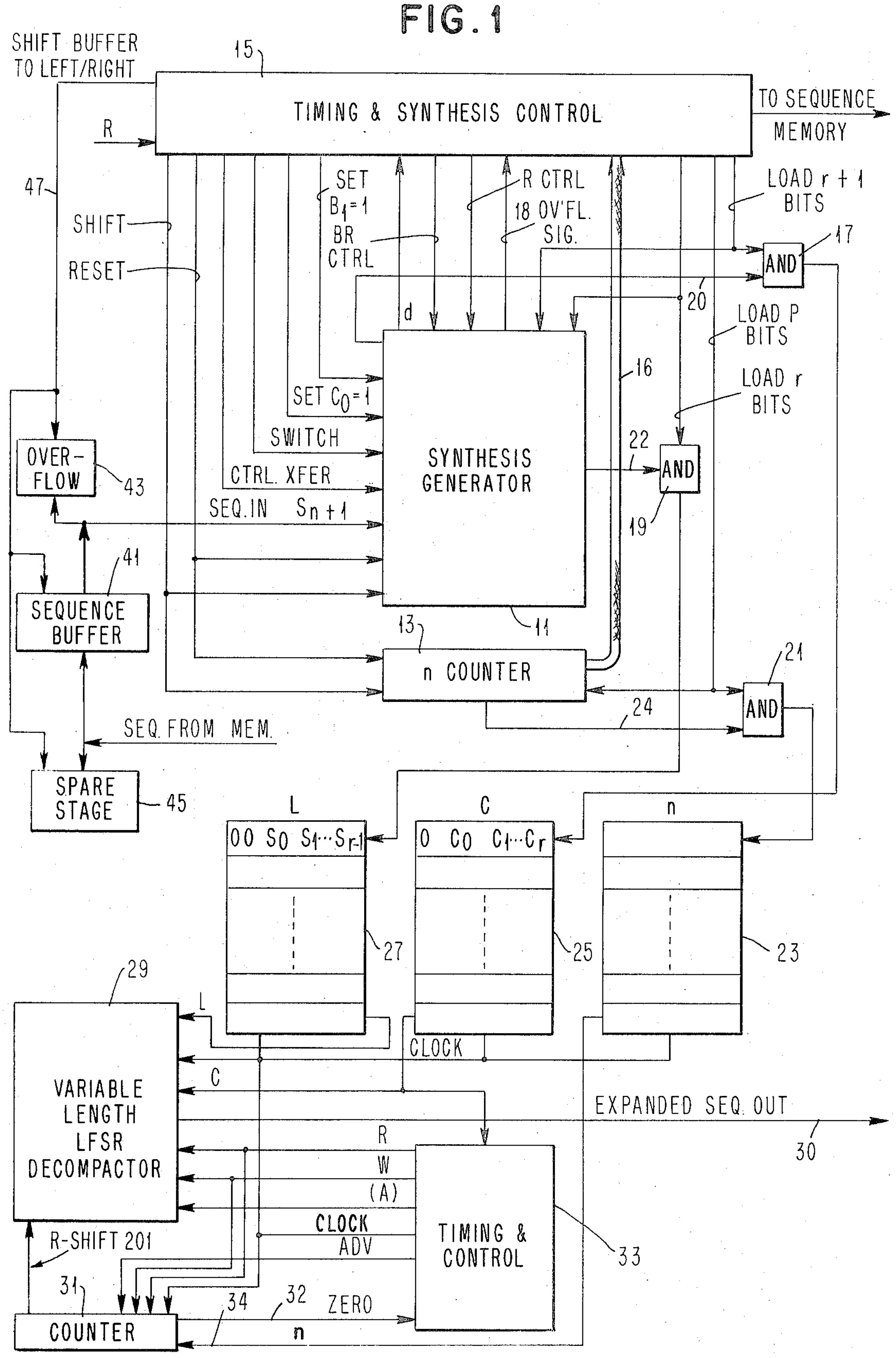
FIG. 1 shows an electrical schematic of compacting apparatus in accordance with the invention for storing a compacted sequence into a memory and expansion apparatus including a variable length linear feedback shift register.
Figure 2:
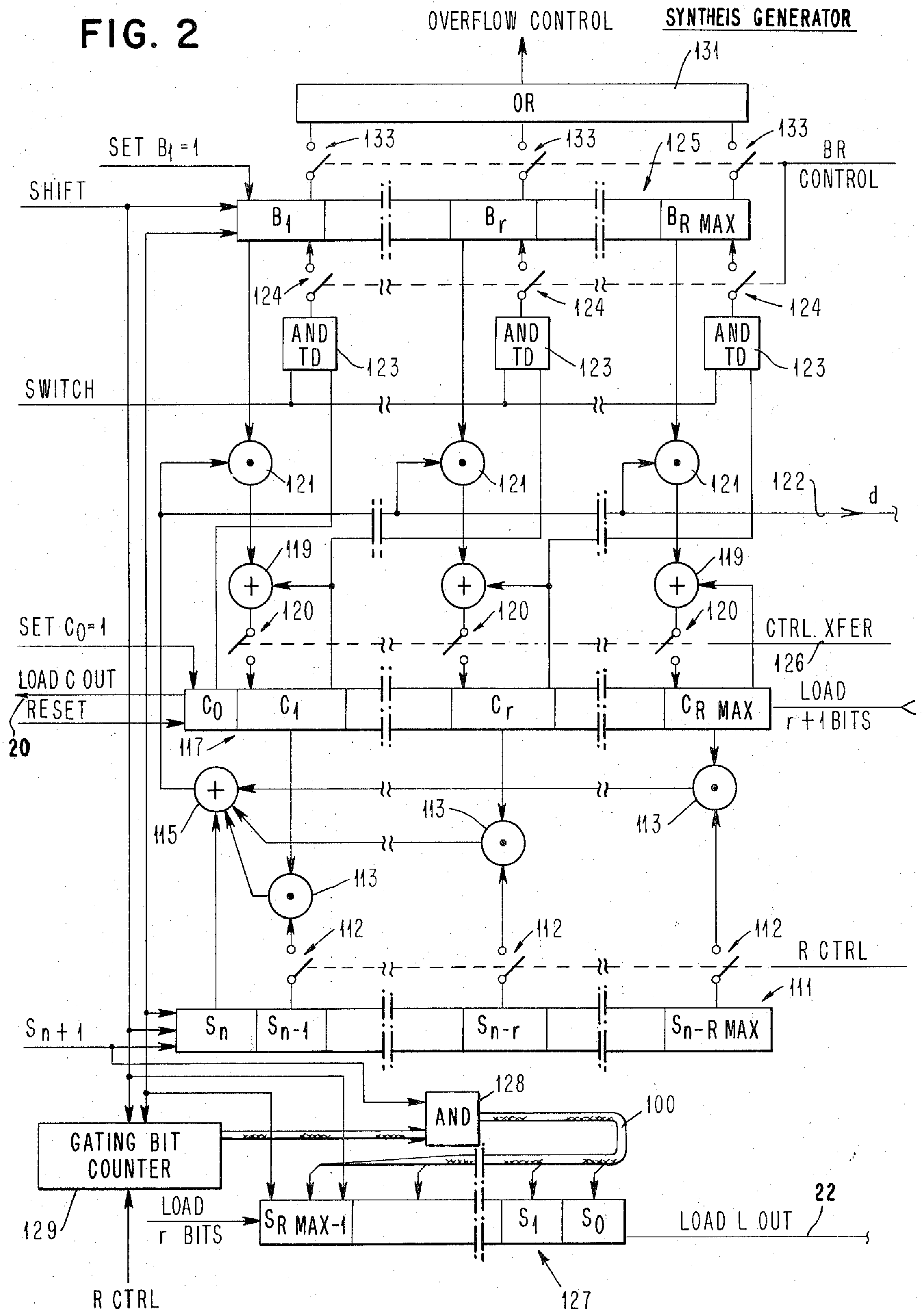
FIG. 2 shows an electrical schematic of the synthesis generator 11 of FIG. 1.

Referring now to FIG. 1, apparatus for performing compaction according to the invention is shown in the form of Synthesis Generator 11, $n$-Counter 13, and Timing and Synthesis Control 15. An embodiment for the Synthesis Generator 11 is shown in FIG. 2 and will be described in detail hereinafter. The $n$-Counter 13 is a counter that counts up in a conventional fashion. The contents of $n$-Counter 13 can be read out like a conventional shift register.

Timing and Synthesis Control 15 employs conventional timing, pulse generating and control circuitry to achieve the timing pulse and signal relationships now to be described. The order of these pulse and signals are as described hereinafter. The text "Digital Computer Design Fundamentals" by Y. Chu, McGraw-Hill (1962), New York, New York, Chapter 11 describes details for designing conventional timing, pulse generating and control circuit to achieve prescribed timing pulse and signal relationships. Also, U.S. Pat. No. 3,048,332, assigned to the same assignee as that of the present invention, in FIGS. 5A to 5Y and FIGS. 6A to 6AQ and the supporting text, describes designs and circuits for implementing prescribed pulse relations.

Timing and Synthesis Control 15 has outputs labeled set $C_0=1$, set $B_1=1$, and SWITCH connected to generator 11. Control 15 also has outputs labeled SHIFT and RESET connected to input terminals of generator 11 and input of terminals of *n*-Counter 13. Control 15 further more has an output labeled CONTROL TRANSFER for controlling the transfer of the polynominals C(D) and B(D) between registers within the Synthesis Generator in order to accomplish correct execution of the compaction algorithm. Control 15 further more has outputs labeled R-Control and BR-Control for setting switches in the Synthesis Generator 11, such that hardware constructed with RMAX stages in the registers of Synthesis Generator 11 can be set to a limit stop R less or equal to than RMAX. Control 15 further more has an output 47 labeled SHIFT BUFFER TO LEFT/RIGHT to sequence buffer for appropriately shifting the sequence back and forth to manipulate the sequence S and insure proper executions of steps 4, 12 and 13 of the algorithm described in Table 1.

Control 15 has an input for receiving the limit stop variable R and another input for receiving the discrepancy signal *d* from generator 11. Control 15 also has an input 16 for receiving the count *n* from *n*-Counter 13. Control 15 furthermore has an input 18 labeled over flow signal which will initiate the limit stop operation, which is step 11 of the algorithm described in Table 1, the next time a discrepancy value of 1 appears on the line labeled *d*. Control 15 also has the capability to produce the value *r* from count *n* and the initial value *r* according to steps 2, 8 and 11 f the algorithm described in Table 1. Control 15 has a load *r* bits output connected to the generator 11 and a first input to AND gate 19. Control 15 also has a load *r*+1 output connected to generator 11 and a first input of AND gate 17. The load P bits output from control 15 is connected to a first input of AND gate 21 as well as an input of *n*-Counter 13 to change the configuration of each stage of *n*-Counter 13 from a binary counting connection to a shift register connection so that the contents of *n*-Counter 13 can be loaded into memory 23 through AND gate 21.

The logic circuits 17, 19 and 21 includes other inputs from the generator 11 and *n*-Counter 13. A second input to AND gate 17 is connective vector C output 20 from generator 11. A second input of AND gate 19 is an initial loading vector L output 22 from generator 11. A second input to AND gate 21 is output 24 from the highest order stage of the *n*-Counter 13. The output of AND gate 21 is connected to a serial input of memory 23 so that the memory 23 can receive the contents of the *n*-Counter 13. In like manner the output of AND gate 17 is connected to a serial input of memory 25. The output of AND gate 19 is connected to a serial input of memory 27.

Each memories 23, 25 and 27 act as conventional dribble down or push down word memories wherein each word propogates from the starting position to an output position. The outputs from each memory will be discussed in conjunction with other apparatus in FIG. 1. It will be recognized by those skilled in the art that memories 23, 25 and 27 are in themselves not part of the invention but are merely a receptacle for the intermediate compacted blocks of information representing the sequence S which has been compacted. The invention will also find utility in a system where memories 23, 25 and 27 are replaced by serial shift registers, the contents of which are then time division multiplexed onto a communication channel for transmission to a remote location. Upon being received and being demultiplexed at a remote location the initial loading vector L, connective vector C, and count *n* would be stored in shift registers and therefore be available as serial outputs in the same manner as the serial outputs are available from memories 23, 25 and 27.

The sequence S is fed from a memory through the sequence buffer 41 into the Synthesis Generator 11. The sequence buffer 41 is equipped with an overflow stage 43 and front-end spare stage 45. The contents of the buffer can be shifted to the right or to the left under control of the Synthesis Control 15 via line 47. The purpose of shifting to the right is reading in the sequence. The purpose of overflow stage 43 is to allow left shift of the sequence by one bit after one compaction cycle. For such left shifts the left most bit of the buffer is transferred to the front-end spare stage 34. The exact function of these stages will be explained in more detail when the operation is discussed. The sequence buffer 41, the overflow stage 43 and the front-end spare stage 45 are a conventional shift register stage(s) which is tapped in the appropriate positions as shown in FIG. 1.

In order to expand the blocks of information representing the compacted sequence, vaiable length feedback shift register decompactor 29 is provided. The detail of decompactor 29 is provided in FIG. 3 and will be described hereinafter. Decompactor 29 has an L input for receiving the initial loading vector L and a C input for receiving the connective vector C. L is provided from the memory 27 whereas C is provided from the memory 25. Note that the memory 27 is read out of the right or most significant digit into the variable length shift register while the memory 25 is read from the left or least significant digit. Thus the position of L and C will be inverted with respect to each other, as required by the expansion method.

The decompactor 29 has an R-SHIFT input 201 connected to the output of counter 31 for receiving shifting impulses. Timing and control 33 furthermore has connections R, W and A to the decompactor 29. Connection R carries the signal controlling the read out of the expanding sequence; connection W carries the signal controlling the writing of L, C and *n* into the registers contained in 29. Connection A controls the read-in of vector L in a manner suitable for decompaction which will be subsequently described in more detail. The expanded data from the decompactor is provided as an output of line 30.

Timing and Control 33 receives a zero input 32 from a counter 31. Also the memory 25 provides the output on the line C to control 33. The output of Timing and Control 33 also provides an ADV input to counter 31. Timing and Control 33 comprises well known timing, pulse and control circuit to achieve the functions specified herein. No special pulse or control signals are required. Pulse and control signals are generated as described hereinafter. The prior art references cited in behalf of the Timing and Synthesis Control unit 15 provide the principles and circuits for generating the pulses originated by the Timing and Control unit 33.

Counter 31 is a conventional counter which decrements the count each time the decompactor 29 is shifted until the count in Counter 31 reaches zero. At that time an output is transmitted to Timing and Control 33 in line 32 to terminate the generation of ADV pulses. Any well known counter can be adapted to perform the specified function.

SYNTHESIS GENERATOR

Referring now to FIG. 2, a more detailed logic diagram of the Synthesis Generator 11 in FIG. 1 and the logic circuit therein is shown. In order to iteratively calculate a connective vector C shift registers 111, 117, 125 and 127 are included in the generator 11. All of the above mentioned registers have a RESET input for resetting each stage of each register to contain a zero bit. Simultaneously the first stages of registers 125 and 127 are adapted to contain a 1 bit. Each shift register 111, 125 and 127 also has a SHIFT input for shifting the contents of each register one position to the right whenever a pulse is received at its respective shift input. The SHIFT and RESET signals are provided from the Control 15. Shift register 117 has an input for shifting the contents of the register to the left whenever shifting signals are applied at the appropriate point.

The first R bits, $S_0$ through $S_{R-1}$ of the sequence S being compressed are loaded into the register 127 on a line 100. A gating bit counter 129 under the control of the R control line loads the $S_0$...bits into the appropriate positions of shift register 127 under control of a plurality of AND gates 128. The register 127 is flip loaded. That is the first bit is loaded into position $S_0$ from the right, $S_1$ is loaded from the right into the position left of S0 but without changing the contents of a position $S_0$ and so forth.

Gating bit counter 129 has a data gate input for clock pulses from unit 15. Gating bit counter 129 is connected to the RESET and SHIFT lines. The counter counts the number of shift pulses that have been received. The counter 129 is further adapted to count to R bits, where R is the limit stop. The number of SHIFT pulses received directly corresponds to the number of bits which have been gated through gating bit counter 129 into the shift register 127. An output of gating bit counter 129 is connected to an inhibit input of the plurality of AND gates 128. A second input of the recited plurality of AND gates is connected to the data input for receiving serial bits of sequence S while the output of the recited AND gates is connected to the data input of shift register 127.

The output of shift register 127 labeled LOAD L OUT emanates from the right-most or least significant stage. The input labeled LOAD *r* bits is provided to shift register 127 from Control 15 to right-shift register 127 *r* positions, thereby transferring the initial loading vector L off a block to memory 27.

The above description of the logic contained within gating bit counter 129 is merely exemplary and it is recognized that other embodiments will be apparent to one skilled in the art of logic design for gating R bits of a sequence S into the storage register 127 for later use as the initial loading vector L in the linear feedback shift register sequence expansion apparatus.

The shift register 111 is adapted to store at least R bits of sequence S in generating connective vector C. The shift register 111 has a data input for receiving bits of sequence S. These R bits of the sequence S are needed to carry out step 4 of the algorithm described in Table 1. Shift register 111 operates in the normal manner wherein a bit of sequence S is shifted into register 111 whenever a shift pulse is received at the SHIFT input. Shift register 111 has RMAX stages, the output of the left most or most significant stage bring connected to an input of a modulo-2 adder 115. The output of each of the remaining stages is connected to each one of the different modulo-2 multipliers 113. Note that the connections from the stages of register 111 to the multipliers 113 are controlled by switches 112 which are in turn controlled by the line labeled R-Control emanating from Timing and Synthesis Control 15 shown in FIG. 1. Only the first R switches counting from the left are closed for a limit stop R. Thus the limit stop can be changed, even if the register 111 has been constructed with RMAX stages. For those skilled in the art it is evident that switches 112 are merely used to describe the intended function and that other embodiments are possible. The register 111 may be reset as provided by the RESET line.

Each modulo-2 multiplier 113 has a second input connected to a output from a corresponding stage of register 117, to be described hereinafter. The output of each of the modulo-2 multipliers 113 is connected to a different input of modulo-2 adder 115. The output of modulo-2 adder 115 provides the discrepancy *d* and is connected as a first input of each of modulo-2 multipliers 121 as well as being connected to the Timing and Synthesis Control 15 (shown in FIG. 1).

Register 117 serves as the repository for the coefficients of C(D) as described previously and used in the algorithm in steps 2, 7, 8 and 11. The shift register 117 has stages $C_1$ through $C_{RMAX}$. Furthermore it has an additional left most stage $C_0$. This stage $C_0$ is provided in order to generate $C_0$ equal to 1 whenever the reset signal is applied. The sequence of the connective vector C is inverted with respect to the sequence of the initial loading vector L. The output of shift register 117 labeled LOAD C OUT emanates from the eft most stage and a LOAD *r*+1 BITS signal is provided to left-shift register 117 *r*+1 positions, thereby transferring the connective vector out, the $C_0$ bit being first.

Register 125 serves as a repository of the coefficients of B(D) as previously described and used in the algorithm in steps 2, 7, 8 and 11. The stage $B_1$ has a set $B_1$ equal to 1 input from Control 15 to set stage $B_1$ of register 125 to 1.

modulo-2 multipliers 113 and modulo-2 adders 115 are designated as the lower logic, whereas modulo-2 multipliers 121 and modulo-2 adders 119 are designated as the upper logic. The terms lower and upper logic are employed in the Massey article, supra (see FIG. 3 thereof) and should aid in understanding the operation of the invention in performing the algorithm described in Table 1.

The output of each of modulo-2 multipliers 121 is connected as a first input of a corresponding modulo-2 adder 119. A second input to the adders 119 is provided from the output of the corresponding stages of the register 117. The output of each modulo-2 adder 119 is connected via a set of switches 120 as input to the corresponding stage of the register 117. Note that switches 120 are controlled by Control 15 as shown in FIG. 1. Modulo-2 adders 119 perform the modulo-2 addition as required by steps 7 and 8 of the compaction method specified by the algorithm described in Table 1. The switches 120 are closed for the steps 7 and 8 of the algorithm in Table 1. Switches 120 will prevent a transfer into register 117 when a signal is transmitted on the transfer control line 126 and switches 120 are open. This is necessary to fulfill the equivalent of steps 8 and 11 of the algorithm described in Table 1 when the length change of the connective vector C indicated by those steps produce a vector C of a length which would exceed the limit stop R.

In order to transfer the contents of each stage of the register 117 into the register 124 while simultaneously calculating a new connective vector, delayed AND gates 123 are provided. The delayed AND gates serve as temporary storage T(D) as specified in step 8 of the algorithm described in Table 1. The gates 123 store the contents of register 117 (corresponding to C(D)). Whenever a length change of C(D) is ensuing, a first input of each AND gates 123 is connected to the output of a corresponding stage of register 117. The second input of each AND gates 123 is connected to the SWITCH line from Control 15. The SWITCH signal controls the transfer of signals from the delayed AND gate via switches 124 into the register 125. (Note that only the left most R switches are closed for a limit stop R; the contact closures are effected by controls signal BR.) The output of each delayed AND gate 123 is connected to a set-input and corresponds to the right or more significant digit stage of register 117 connected to dalayed AND gate 123. Thus the contents of stage $C_0$ is transferred to $B_1$, the contents of stage $C_1$ is transferred to $B_2$ and so forth. The outputs of register 125 are connected to the modulo-2 multipliers 121. Although shown in this embodiment as an electronic circuit, the functions of each delayed AND gate 123 is the same as the function of each switch shown by Massey, supra (see FIG. 3).

Switches 133 and an RMAX input OR-circuit 131 perform the function of step 11 of the algorithm in Table 1. Selection of a specified limit stop R closes one switch 133 (the one at stage $B_{R+1}$). This closure is effected by the control signal BR. The OR-circuit 131 then produces an overflow signal which is supplied to the Control 15. When this occurs, the next occurrence of a discrepancy value $d$=1 produces a control transfer signal on line 126, which opens switches 120. For those skilled in the art it is evident that swtiches 120, 124 and 133 merely represent an intended function and other embodiments are possible.

VARIABLE LENGTH LINEAR FEEDBACK SHIFT REGISTER (LFSR) DECOMPACTOR

Figure 3:
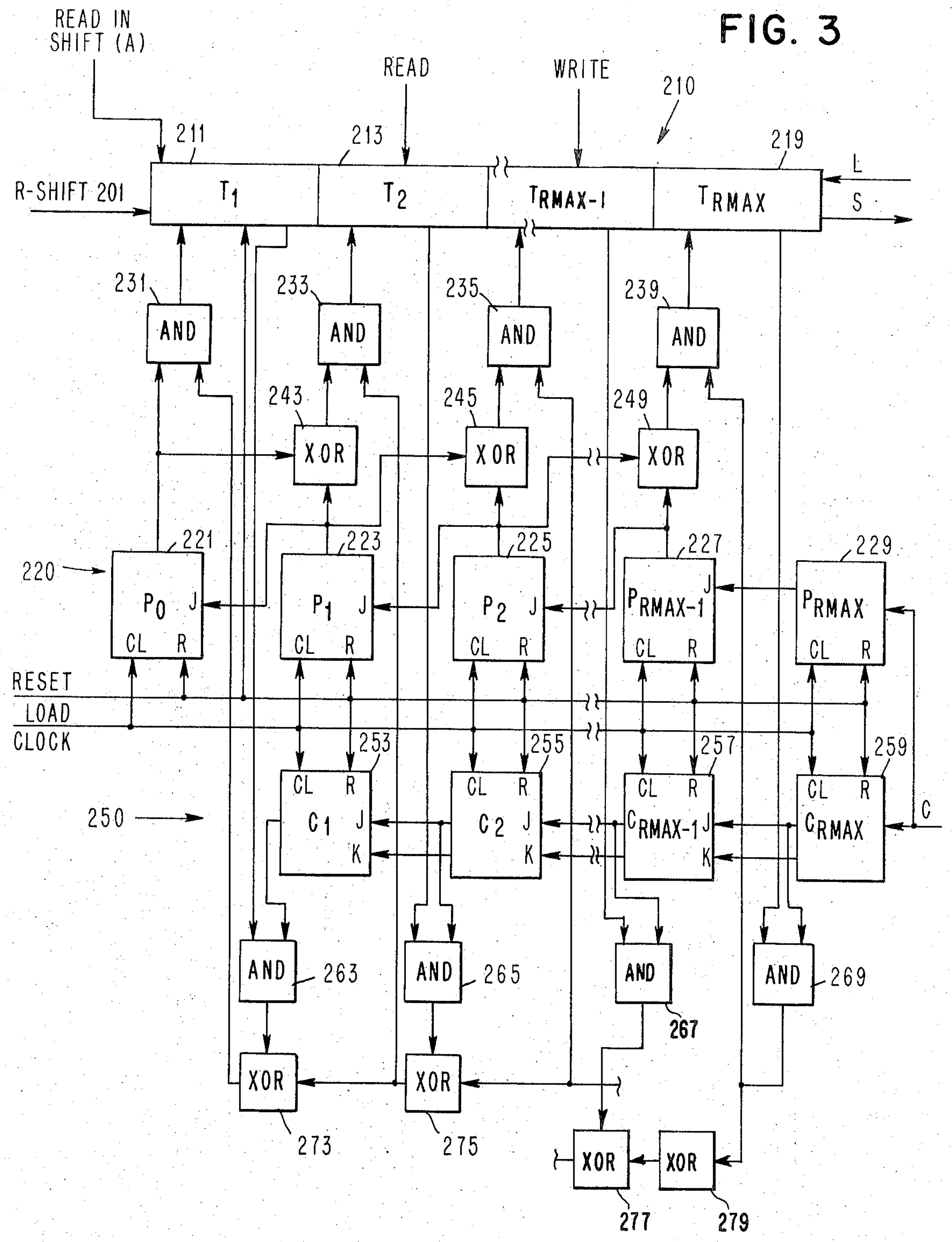
FIG. 3 shows an electrical schematic of the variable length linear feedback shift register 25 of FIG. 1.

Referring to FIG. 3, the variable length linear feedback shift register the decompactor 29 is shown. A central element in the decompactor 29 is a shift register 210 having RMAX stages. Shift register 210 has a R-SHIFT input 201 for shifting the contents of the register to the right. Shift register 210 also has a read in shift input (A) for loading the register from the right and shifting to the left. The register 210 is adapted to limit entry of r bits into the register while shifting R+1 bits into registers 220 and 250, to be described hereinafter. This is accomplished by providing appropriate read in shift pulses to the register 210. The number of shift pulses is determined by subtracting the number of zero's heading the C vector from R or the limit stop. Thus the L vector can be positioned correctly into the stages of registers 210, even if the number of bits to be loaded is less than R or less than RMAX. After expansion the sequence S appears at the output of the right or most significant stage, as will be shown later in an example.

To control the length of the shift register configuration of decompactor 29, a pointer register 220 composed of RMAX+1 stages is provided. Each stage is adapted for J-K flip-flop operation. A J input is provided to each stage for setting the stage whenever a load clock pulse is received at the CL input. Note that the load clock line always carries a set of R+1 pulses while the read in shift line carries a set of R pulses. The J input of the right or most significant stage of the pointer register is connected to the connective vector output (C) of memory 25. The stage is set with a load clock pulse, generated in the Timing and Control 33 by $C_0$ of the connective vector which is always a 1 bit. The 1 bit loaded into the right or most significant stage of the pointer register is left-shifted with each load clock pulse. The right or more significant stage of the pointer register are not reset as $C_0$ is propogated to the left, since no K input is provided to any of the stages of the pointer register. The output stages $P_1$ through $P_{RMAX-1}$ of the pointer register is connected to an input of a corresponding exclusive-OR circuit. For example the outputs of stages 223, 225 and 227 are connected to input of exclusive-OR circuits 243, 245 and 247 respectively.

A second input to each exclusive-OR circuit is connected to the output of the next higher or more significant stage of the pointer register. For example, the output of stage 221 is connected to a second input of circuit 243 while the outputs of circuit 223 and 225 are connected to second inputs of circuit 245 and 247, respectively.

While the connective vector C is loading the pointer register, the bits of the connective vector are also being shifted into connective vector register 250. Register 250 has both J and K input at each stage connected to ON and OFF outputs of the next left most stage. Therefore unlike the pointer register, a true representation of the connective vector C is shifted into register 250. The output of stages of 253, 255, 257 and 259 of register 250 controls AND gates 263, 265, 267 and 269, respectively to provide the proper feedback connections within the decompactor 29. For example, first input of AND gates 263, 265 and 269 are connected to ON-outputs of stages 253, 255, 257 and 259 respectively. Second inputs of AND gates 263, 265 and 269 are provided from ON-outputs of stages 211, 213, 217 and 219 of register 210. The output of each AND gate 263, 265 and 267 is connected to the first input of corresponding exclusive-OR circuit 273, 275 and 277, respectively with the exception of AND gate 269 which has an output connected to the second input of the exclusive-OR circuit 277 to its left. The output of each exclusive-OR CIRcuit is connected to the second input of a next leftmost exclusive-OR circuit. For example, the first input of exclusive-OR circuit 273 is connected to the output of AND gate 263 while the second input to circuit 273 is connected to the output of circuit 275.

To provide a LFSR of length $r$ when an $r+1$ bit connective vector C is loaded into the registers 220 and 250, the output of stage 221 and the output of circuits 243, 245 and 249 are connected as first inputs to the AND gates 233, 235 and 239, respectively. Second inputs of AND gates 231 through 237 are connected to the feedback outputs of the exclusive-OR circuits 273, 275,....and the output of AND gate 269, respectively. The outputs of AND gates 231 through 237 are connected to inputs of stages 211 through 219 of register 210. In this fashion only the AND gate connected to the left most or least significant stage of register 250 is activated. The feedback portion of the LSFR is completed through this single AND gate activated in the previously described connective.

OPERATION-DATA COMPACTOR

The apparatus of FIGS. 1, 2 and 3 will now be exercised to provide a detailed understanding of the invention. An example sequence S shown in FIG. 5A will be compacted and expanded using the apparatus of FIGS. 1, 2 and 3. FIG. 5A comprises 300 bits of 1's and 0's. The data begins at $a$ and extends across the top row of FIG. 5A. Thereinafter each row follows the preceding row. The sequence will be compacted into 10 data blocks indicated in FIG. 5B, each block comprising bits defining an initial loading vector L, a connective vector C, and $n$ count. FIG. 5B indicates the 300 bits of FIG. 5A are compacted into 170 bits.

The message statistics curve of FIG. 4 is applicable to the example of sequence of FIG. 5A. As can be seen by reference to FIG. 4, the highest efficiency data compaction occurs when the register limit stop R is chosen to be 5 bits. FIG. 4 is based upon P = 6 or the $n$-Counter 13 providing a maximum count of 63. Since RMAX is chosen to be 8, the number of stages in the register 111 (FIG. 2) will be 8. The five left most switches 112 will be closed to adapt the hardware to the limit stop R=5. Similarly, the five left most of the eight switches 124 for register 125 are closed. One of the eight switches 133 is also closed for register 125; it is the switch at position B6 of the register 125, as will be noted hereafter.

The contents of the registers 111, 117, 125 and 127, as well as the contents of the $n$-Counter 13, are shown in FIGS. 6B, C and D. The registers 125 and 127 are shown as being 8 stages, registers 111 and 117 as having 9 stages. Note that each register has three inactive stages, as indicated in FIGS. 6B and C. Note further that stage B6 of 125 has the switch 133 closed. FIG. 6D also shows the value of the discrepancy $d$, the decimal equivalent of count $n$, the binary value of the overflow bit, the number of the compaction cycle, the number of the compaction step, the state of gating bit counter 129 and the state of the control transfer bit which actuates switches 120. The settings of the registers are given for steps R to 11 and 38 and 39 in the compaction process beginning at $a$ (FIG. 5A), the cycle. The settings of the register are given for steps R to 10 and 30 and 31 in the second compaction cycle beginning at $b$ (FIG. 5A). The first six steps of compation cycle 7, beginning at point $g$ (FIG. 5A) is given. Cycle 7 shows the self adaptive feature of the compaction process.

The compaction process for block $a$ begins with setting the registers and counters in FIG. 6A to the status indicated at step R, cycle 1; step R indicates the RESET condition. FIG. 6A shows that stages $B_1$ and $C_0$ of registers 117 and 125 are set to one, while all other stages of registers 111, 127, 117 and 125 are set to zero. The $n$-Counter is set to all 1's, such that the next bit will make it overflow and show all 0's.

Compaction is commenced by loading the first bit of the segment of S beginning at $a$ into registers 111 and 127 (FIG. 2). The first bit is a 1 bit and it is placed in position $S_0$ of register 127 and position $S_n$ of register 111. Step 1 of cycle 1 in FIG. 6A shows the condition of the register after loading the 1 bit of the segment beginning at $a$. Note that $n$ is now 000000, and the first step of the cycle is indeed recognized by an $n$-count of 0, as per step 2 of the algorithm described in Table 1.

Turning to FIG. 6, when the first bit in the segment beginning at $a$ has been loaded into register 127, the counter of gating bit counter 129 advances one count. The discrepancy is checked and found to be 1, because all stages of register 111 except for $S_n$ hold zero's. A pulse appears on the SWITCH line which causes the contents of $C_0$, which is a 1, to be transferred to the left most AND gate 123. The contents of stages $C_1$. . . $C_5$ are all zero. These zero's are transferred into the AND gate 123, corresponding to stages $B_2$ to $B_6$. Simultaneously, the contents of $B_1$ is transferred into stage $C_1$ of register 117. The contents of the AND gate is transferred with a small delay into register 125. Note that only the contents of the five left most AND gates 123 are transferred into register 125, because only five of the switches 124 are closed. After this transfer the connective contains $C_0 = 1$, $C_1 = 1$, and the register 125 contains $B_1 = 1, B_2 =, B_3 =, ... B_{RMAX} = 0$. The connective has thus been changed in length, and B(D) − C(D) from the last step. These operations correspond to step 8 of the algorithm described in Table 1.

The next bit of the sequence S is loaded into registers 111 and 127. The gating counter 129 and the $n$-Counter 13 advance 1 count. The $n$-Counter 13 holds a count of 1. The 1-bit in stage $B_1$ of register 125 is shifted one position to the right and a 0 is shifted into position $B_1$. The discrepancy $d$ is 0. Since $n$ is smaller than $2^P$, the check specified by step 10 of the algorithm (Table 1) is negative, $n$ is increased by 1, and the next bit of S can be loaded. Counter 129 is advanced and the contents of register 125 are shifted by one more position to the right. The discrepancy $d$ is 0. This process continues until at the step five of cycle 1 the first five bits of sequence S are contained in registers 111 and 127. Turning to FIG. 6, the register 125 holds the 1 in the fifth position from the left. The $n$-Counter 13 holds a count of four. The gating counter 129 hold a count of five and closes the gate 128, such that no more bits can be entered into register 127 during cycle 1.

At step 6, as the sixth bit of S, a zero, is loaded into register 111, the discrepance $d$ is 1. This causes the control logic 15 to perform a check and a pulse to appear on the SWITCH line. Returning to FIG. 2, the contents of register 117 are transferred to the delayed AND gates 123 and the contents of register 125 are transferred to the register 117 and added to the contents of register 117 by the modulo-2 adders 119. The contents of register 117 are now 1, 1, 0, 0, 0, 1, for $C_0$, $C_1$, $C_2$, $C_3$, $C_4$ and $C_5$, respectively. The contents of register 125 are 1, 1, 0, 0, 0, for $B_1$, $B_2$, $B_3$, $B_4$ and $B_5$, respectively. The next bit of S is shifted into register 111 and the $n$-Counter 13 advances to 5. The register 125 now contain 0, 1, 1, 0, 0, for $B_1$ and $B_5$, respectively. The discrepancy d is again 1 and the transfer from register 125 to register 117 with simultaneous addition through the modulo-2 adders 119 takes place. Note, that since $n$ is less than 2 times $r$, in this case no SWITCH pulse is generated. The contents of register 117 are transferred to the AND gates 123 but not passed on to register 125.

Returning to FIG. 6B at step 7 in cycle 1, the register 117 contains 1, 0, 1, 0, 0, 1 and register 125 contain 0, 1, 1, 0, 0. The next bit of S is shifted into register 111. At this point the first bit has reached position $S_{n-R}$ in register 111. This discrepancy is 0, $n$ is 7. At the next shift the first bit reaches position $S_{n-(R+1)}$ in register 111. This is the first stage for which switch 112 is open, and thus this bit will not contribute to the discrepancy any more through this cycle. At step 9 in cycle 1, the discrepancy is 0, $n$-count is 8, C remains unchanged. As the 10th bit of S is moved into position $S_n$ the right most 1 in register 125 reaches the position for which switch 123 is closed. Thus an overflow signal is generated, which signifies the situation where $n$ is equal to or greater than 2R. Hence the next discrepancy value of 1 will end the compaction cycle.

The remaining bits of the segment beginning at $a$ are shifted into register position $S_n$. For every bit which is shifted into the register the discrepancy is checked. The discrepancy will stay zero until the 39th bit of the segment beginning at $a$ is shifted into register 111. At this point the discrepancy becomes a 1, which is shown as step 39 of cycle 1. The 1 bit causes the Control 15 (FIG. 1) to create a pulse to be transmitted on the control transfer line 126 of FIG. 2. In FIG. 2, the control transfer pulse opens the switches 120. Hence the contents of register 117 cannot be changed by the contents of register 125. Register 117 cannot be changed by the contents of register 125. Register 117 holds the final connective vector C of the first cycle of compaction. The control transfer pulse also is responsible for creating the load $r$ bit and load $r$+1 bit pulses in Control 15 (FIG. 1). These pulses control read out of registers 127 and 117, respectively. In the same fashion the load P bit pulse is transmitted to $n$Counter 13, to read out the contents. Registers 117, 127 and the $n$-Counter 13 are now read into the memories 23, 25, and 27 (FIG. 1). The contents of the memories are now the same as shown as the top row of block 1 in FIG. 5B. The memory 27 contains $S_0$, $S_1$, $S_2$, $S_3$ and $S_4$, the memory 25 contains bit $C_0$, $C_1$, $C_2$, $C_3$, $C_4$ and $C_5$, and the memory 23 contains the bits 1, 0, 0, 1, 1, 0.

Reading out the contents of registers 117, 127 and the $n$-Counter 13 (FIG. 1), creates a reset pulse which resets registers 125, 117, 127 and 111 and resets the gating bit counter to 0. Simultaneously, the sequence S in the buffer memory 41 (FIG. 1), is moved to the left by 1 bit. The 39th bit of S, which is the first bit of the segment beginning at $b$ is available in the overflow stage 43. The Control 15 (FIG. 1) is adapted to shift the 39th bit into the position of the sequence buffer 41 which will be read next into registers 111 and 127. At the same time the left most bit contained in the sequence buffer 41 is moved into the front end spare stage 45. The left most digit will be available at the next right shift for transfer back into sequence buffer 41. The transfer of the sequence S out of the memory is suspended during this operation. This is necessary because bit 39 of the sequence S or the first bit of the segment beginning at $b$ has caused the end of compaction cycle 1. However, bit 39 is not contained in the compacted data representation resulting from cycle 1. The read out and shifting of S corresponds to step 12 of the algorithm described in Table 1. The compacted data for the first 39 bits of sequence S appears as block 1 in FIG. 5B. This resetting and shifting of sequence S starts the compaction cycle 2 and the Synthesis Generator 11 in FIG. 1 is now ready for accepting the next segment of sequence S, starting at $b$ in FIG. 5A.

The data contained in sequence S is now moved from buffer 41 into the appropriate stages of register 111 and 127 as it was done in cycle 1. Turning to FIG. 6D at step 1, cycle 2, the discrepancy is zero. When the next bit (bit 40 of S, or the second bit of the segment beginning at $b$ is moved into registers 127 and 111, the discrepancy is 1 at step 2, cycle 2. A change of the C-vector takes place at step 2. The contents of register 117 becomes 1, 0, 1. At step 2 the discrepancy is 1 and the connective vector is changed. The length of vector C, however, remains unchanged. Notice that register 127 has maintained the appropriate order of the first five bits of segment $b$ (FIG. 5B) by flip loading, i.e. bit 39 is in stage $S_0$, bit 40 is in stage $S_1$ and so forth. At step 5 the gating counter 129 stops and no more bits are read into register 127.

The discrepancy remains 0 for steps 3, 4, 5 and 6. During these steps the contents of register 117 stays unchanged. The contents of register 125 are shifted by four positions to the right during steps 3, 4, 5 and 6. At step 7 the discrepancy is 1, and the length of C is changed. Thus C has assumed a final length for this compaction cycle. At step 8 of the segment beginning at $b$ the discrepancy is 1, which adjusts C, but without length change. From step 9 to step 30 in the segment of S beginning at $b$ the discrepancy is 0 and no change of C takes place. At step 10 of this cycle the overflow control is set. At step 31 the requirement for an excessive lengthening of the connective vector is indicated. Compaction cycle 2 is ended. The compaction process is stopped and the contents of registers 117, 127 and the $n$-Counter 13 are moved into memories 23, 25 and 27 (FIG. 1). Block 1 (see FIG. 5B) which represents the segment of S beginning at $a$ is shifted down in memories 23, 25 and 27. Thus the top position in memories 23, 25 and 27 are occupied by block 2 (see FIG. 5B) and the second or next lower position is now block 1.

The shifting out process resets the Synthesis Generator (11 in FIG. 1) which provides pulses to shift sequence S by one position to the left in buffer 41 and stages 43 and 45. The apparatus is now ready for accepting a third segment or $c$ of the original sequence S beginning at point $c$ (FIG. 5A).

The segments in S beginning at points $c$, $d$, $e$ and $f$ are compacted in a manner like described for segments beginning at $a$ and $b$. The compacted data for these segments are shown as blocks 3, 4, 5 and 6, respectively, in FIG. 5B.

The sequence segment beginning at $g$ is moved into registers 111 and 127. Turning to FIG. 6D, the discrepancy at step 1, cycle 7 is 1. The length of the vector C is now changed. The second bit of the segment beginning at $g$ is now moved into the registers 111 and 127. The discrepancy is 1 as shown in step 2. A correction without length change occurs in the contents of register 117. As the next or third bit of segment beginning at $g$ is moved into registers 111 and 127 the discrepancy is zero and the contents of the register 117 does not change. At the fourth bit of the segment beginning at *g* the discrepancy is 1 and a change in length based upon step 8 of the algorithm in Table 1 takes place. The fifth bit of segment beginning at *g* produces a discrepancy of 1, which in turns causes a change of C. The sixth bit of segment beginning at *g* produces a discrepancy of 1 which necessitates adjustment of C without changing length. At this point the connective vector is $C_0=1$, $C_1=1$, $C_2=1$ and $C_3=1$. This happens to be the final connective vector C for cycle 7.

The 7th to 23rd bits of the segment beginning at *g* do not produce a discrepancy. However, at bit 9 the overflow control pulse is generated. Moving bit 24 of the segment beginning at *g* into register 111 produces a discrepancy of 1 which would require a length change. Because the length change would produce a connective vector C far in excess of R+1 bits, the apparatus performs step 11 of the algorithm in Table 1. At this point, the data from registers 117, 127 and *n*-Counter 13 is shifted into memories 23, 25 and 27. Note that the length of the connective vector has only four bits. Therefore, the parameter *r*, as indicated in the algorithm has a value of 3. This means that only the last three bits from register 127 are loaded out, which means the bits in positions $S_0$, $S_1$ and $S_2$. In a similar fashion only four bits of register 117 are loaded out. The resulting data is shown as block 7 in FIG. 5B. Note that in block 7 only places $S_0$, $S_1$ and $S_2$ are indicated for the initial register loading vector L, while only $C_0$, $C_1$, $C_2$ and $C_3$ are indicated for the data that represents the connective. This process describes the self-adaptive feature of the compaction algorithm. Note that the places in front of $S_0$, $S_1$, $S_2$, $C_0$, $C_1$, $C_2$ and $C_3$ are filled with zero's. The zero's are necessary because all blocks of the compacted data must have the same length.

The decompactor (29 of FIG. 1) will have a configuration of a three bit register to expand the compacted data of block 7. As will be shown the decompaction hardware will sense the fact that only four actual bits are contained in the connective vector C. In contrast, the compacted data in blocks 1 and 2, where $C_0$ is indeed the left most bit, will cause the decompactor 29 to perform as a five bit linear feedback shift register.

The compaction continues for segment beginning at *h* as described for segments beginning at *a* and *b*. Segment *h* will result in compacted data shown as block 8 in FIG. 5B. Block 8 corresponds to a five bit LFSR register. The next segment to be compacted starts at point *i* indicated in FIG. 5A. The compacted segment will be represented by block 9 shown in FIG. 5B. The last segment beginning at *j* will be compacted, producing block 10 of FIG. 5B. In this particular case the LFSR to decompact the data will be a four bit register configuration, because $C_0$ appears as the fifth digit from the left of the second group of bits in block 10. Compaction is terminated with the segment beginning at *j*.

OPERATION—DATA DECOMPACTOR

Expansion of the compacted data using the variable length (LSFR) decompactor 29 of FIG. 1 will now be described. FIG. 3 shows the decompactor register in greater detail. A step by step display of the bits in the register stages of the LFSR is shown in FIGS. 7A and B. Expansion of the compacted data will be described in conjunction with FIGS. 3 and 7A and B. FIGS. 7A and B assume that the LFSR is an 8 bit register. Hence the upper register 210 has eight stages, such that RMAX is 8. The expanded segment can be observed at the output of the register 210, which is stage 219. Note that because the limit stop (R) was chosen to be 5, the three left most stages $T_1$, $T_2$ and $T_3$ will always contain 0's. Note further that initially $S_0$ will always be contained in $T_8$, $S_1$ in $T_7$, $S_2$ in $T_6$ and so forth.

Block 2 of FIG. 5B is loaded into the LFSR from memories 25 and 27 (FIG. 1). The counter contents is loaded from memory 23 into register-counter 31. At the same time the contents of memory 25 is loaded into the registers 220 and 250 of FIG. 3. In FIG. 3, register 220 serves as the First-1 pointer. Observe that the connective always has a 1-bit in place $C_0$ (see FIG. 5B). At the first shift this 1 sets flip-flop 229 of the First-1 pointer. At the next shift flip-flop 227 of the same register is set without resetting flip-flop 229. This process continues until all R+1 bits are loaded, thereby placing all *r*+1 bits of the connective C have been placed in register 250 into the *r*+1 positions from the right. Thus there will be a left most stage in 220 containing a 1 and all stages to the right in register 220 containing 1's.

The First-1 pointer activates the exclusive-OR gates 247, 245, 243 and so forth. The exclusive-OR circuit gate above stage $P_{RMAX-(r+1)}$ containing the left most one receives a zero at the left input from stage $P_{RMAX-(r+2)}$. Thus a single one appears at the input of the associated exclusive-OR gate. The exclusive-OR gate to the right of the above mentioned gate receives two 1's: one from the stage $P_{RMAX-r}$ and one from the stage $P_{RMAX-(r+1)}$. This is true for all the stages further to the right. Thus only one of the AND gates 231, 233 to 239 is open. The open AND gate provides the feedback path for the register. Thus the feedback is adaptive and the position may change for each block. Note, that the right most stage 229 of register 220 is not connected to any gate. This stage serves as a delay stage. Register 220 serves primarily the function to define the position of $C_0$ and close the feedback path. Register 250 conversely does not need a stage $C_0$ and hence terminates on the left with a stage 253 for $C_1$.

For block 1 of FIG. 5B the feedback will be at the sixth stage of register 210 counting from the right. Simultaneously the 6 bits of the connective vector of block 1 have been read into register 250. Only the 5 bits $C_1$, $C_2$, $C_3$, $C_4$ and $C_5$ need be stored in the stages of register 250. However, for *r* less than RMAX, $C_0$ will be stored in register 250, but it has no effect, since the feedback path is closed to the right of it and open to the left of it.

Simultaneously, with loading the connective vector C, the initial loading vector L of block 1 is loaded into register 210. Note the relative position of $C_0$, $C_1$, $C_2$, $C_3$, $C_4$ and $C_5$ with respect to $S_4$, $S_3$, $S_2$, $S_1$ and $S_0$ as shown in FIGS. 5B and 7A. This relationship is necessary to produce in a correct manner the segment beginning at *a* of sequence S as shown in FIG. 5A.

The WRITE line activates the transfer of the data from memory 23, 25 and 27 into the registers 210, 220 and 250. The register counter 31 (FIG. 1) is placed into the read mode under control of the timing control 33. In this mode the register counter works as a down-counter emitting an R-SHIFT pulse on line 201 for every ADV clock pulse entering the counter. The shift pulse operates the linear feedback shift register, which is composed of the register 210 and the appropriately made connections through AND gates 263, 265 up to 269 and the exclusive-OR gates 273, 275 and 277.

The initial loading of block 1 puts five 1 bits into the stages of register 210 and the connective as indicated in step 1, cycle 1 of FIG. 7A. At the first shift pulse the feedback into register 210 will be a 0. The sixth bit of the segment of S beginning at *a* is placed into the last stage of the shift register as adapted for this particular sequence. The next shift will again produce a zero. One more shift has placed the contents of the register with respect to the connective vector C into such a position that a one bit is produced. This process continues in the manner described for any linear feedback shift register. See the text "Shift Register Sequences" by S. W. Golomb, supra.

The segment of sequence S beginning at *a* can be observed in the position $S_0$ of register 210. By continuing along from step 1 to step 38 the bits of the segment are reproduced in the exact order as shown in FIG. 5A. Between steps 19 and 32 the register changes in a manner consistent with the operation of a linear feedback shift register. After down-counting 38 bits, counter 31 emits a stop pulse. At this point all 38 bits of the segment beginning at *a* as indicated in FIG. 5A have been reproduced. The bits appear as an output from $S_0$ or $T_8$. The stop pulse also produces a reset pulse which resets register 210, 220 and 250 of the decompactor 29.

Figure 7B:
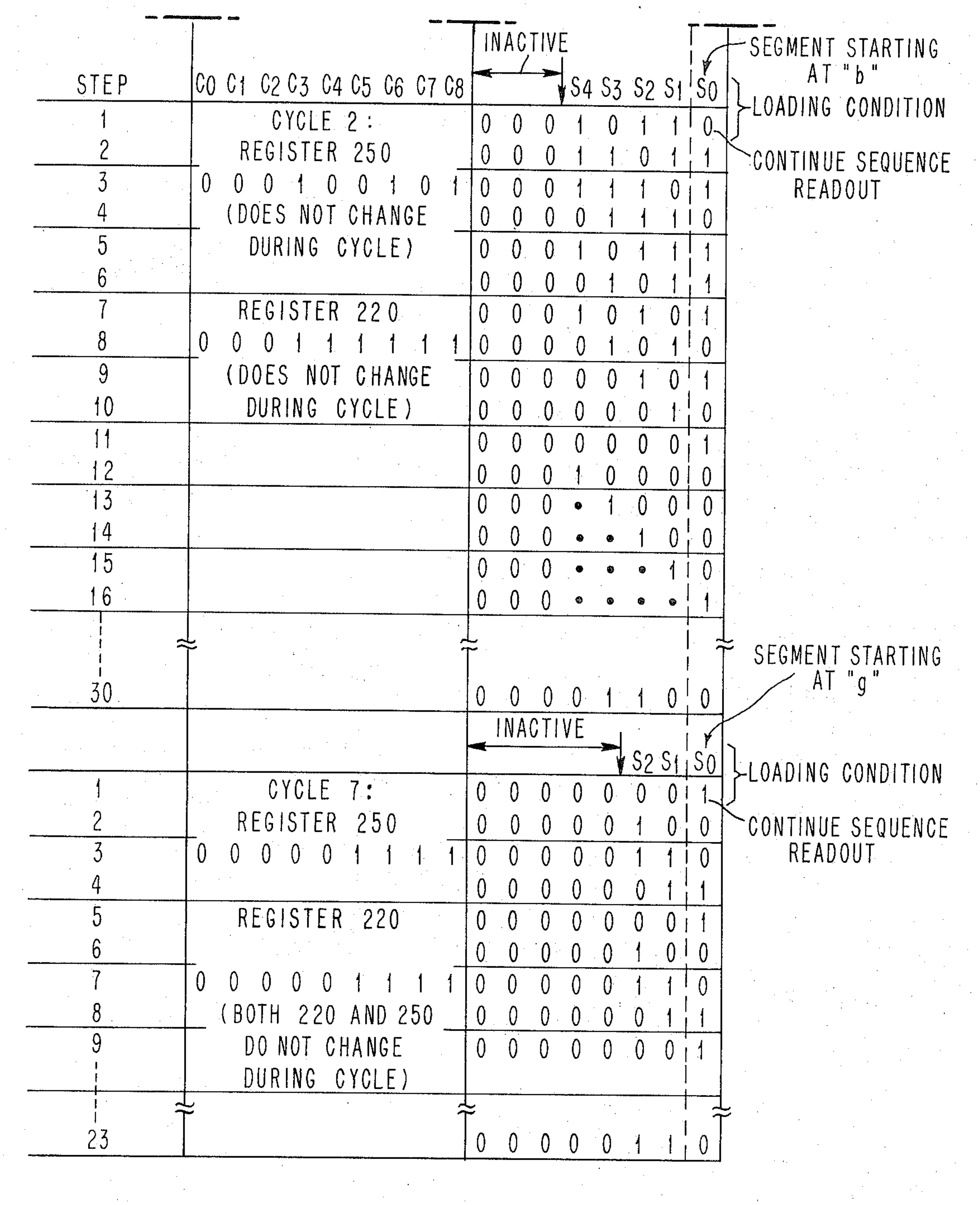
FIGS. 7A and B shows data contents of various registers and counters in the apparatus of FIG. 3 during expansion.

The reset pulse in turn triggers memories 23, 25 and 27 to load the next block, which is shown as block 2 in FIG. 5B. This is shown as step 1 of cycle 2 in FIG. 7B. The loading vector L of block 2 is moved into register 217, the connective vector C of block 2 is moved into register 250 and simultaneously adjusts the First-1 pointer. At the same time the count *n* is moved into counter 31 which is in a shift register configuration for this operation. As soon as the registers are loaded the WRITE control (FIG. 3) is turned off and the READ control (FIG. 3) is initiated. The decompactor 29 starts producing the segment of S beginning at *b* as shown in FIG. 5A. Only the first 16 steps are shown in FIG. 7B.

Block 7 shown in FIG. 5B requires only a 3 bit shift register. A 3 bit decompactor register results in $C_0$ being placed in the fourth position from the left of the second 6 bit section of block 7. This is indicated in the lower part of FIG. 7B. Note that only three places of register 210 carry meaningful bits. Note further that the feedback is closed into the third position of register 210 counting from the right. This indicates the fashion in which the decompaction or expansion apparatus is self-adaptive and produces a varying length of shift register configuration needed to perform the decompaction correctly.

The process of decompaction or expansion and resetting continues until all 10 blocks have been processed through the decompactor and the original sequence S has been reproduced.

While this invention has been particularly shown and described with reference to the preferred embodiment, it will be understood by those skilled in the art that the foregoing and other changes in form and detail may be made therein without departing from the spirit and scope of the invention.

What is claimed is:

1. Apparatus for changing the length of digital information comprising:

a. means for receiving and storing bits $S_0$ through $S_{R-1}$ of a sequence S where R is an integer limit stop selected to provide optimum processing of the sequence S and equal to the maximum number of stages of a shift register.

b. said receiving and storing means comprising timing and synthesis control, syntiesis generator, *n* counter and combinatorial logic circuits for generating a plurality of blocks of digital data, each block descriptive of a segment of the sequence S, each block defining an initial loading vector L, a connective vector C and a length count n, the sum of the lengths of the blocks being less than the length of the segment they represent in the sequence S, c. a feedback path comprising a plurality of connections and switching elements interconnecting various shift register stages and the input of the shift register, said switching elements being responsive to the connective vector C, generated and provided by the receiving and storing means, in regenerating the segments in the sequence S, d. and means including a counter responsive to the block defining the length of count to generate a signal to further control the shift register in regenerating the sequence S from successive connective vectors C and the lengths of count *n*.

2. The apparatus of claim 1 wherein each of said connections includes a pointer register for establishing the number of stages in the shift register connected to the feedback path based upon the block defining the connective vector C.

3. The apparatus of claim 1 wherein each switching element is a register stage of a connective vector register resonsive to the connective vector C means for establishing the number of connections in the feedback path.

4. Apparatus for changing the length of a digital information sequence S into a plurality of blocks, each block defining a segment of said sequence S, each block defining an initial loading vector L, connective vector C, and a length count *n*, comprising:

a. storage means for storing bits $S_0$ through $S_{R-1}$ of said sequence S, said bits $S_0$ through $S_{R-1}$ being the first R bits of a segment of said sequence, where R is an integer limit stop;

b. a gating bit counter connected to the data input of said storage means for loading said first R bits of said segment into said storage means;

c. iterative calculating regiaters and interconnecting logic circuits for iteratively calculating a connective vector C, of length R+1 for each R bits of said sequence stored in said storage means;

d. counting means for determining the length count *n* representing the number of bits which have been compacted and provided to the storage means, e. means for controlling said iterative calculating means to terminate said iterative calculation when the bit quantity of the sequence S, corresponding to the counting means capacity, have been provided to the storage means, f. and means for gating said initial loading vector L from said storage to a first memory where said L is the first R stored bits in the storage means, said initial vector L forming a part of the blocks of data representing the sequence S.

5. The apparatus of claim 4 further comprising means for gating the connective vector C from the iterative calculating registers to a second memory and means for gating the length count $n$ from the gating bit counter to a third memory.

6. Apparatus for changing the length of a series of digital data blocks (B) into a sequence (S) where the length of S is greater than the sum of the lengths of the data blocks (B) where a first data block defines a loading vector L, a second data block defines a connective vector C and a third data block defines a length count $n$, a. a variable length feedback shift register means responsive to input signals to generate a sequence S based upon the data block for the loading vector L, the connective vector C and the length count $n$, b. source means to provide first and second signals to the variable length feedback shift register, said first and second signals being descriptive of the data blocks which define the loading vector L and the connective vector C, c. said source means further adapted to provide third signals descriptive of the data block which defines the length count $n$, d. a counter responsive to the third signals for providing shift signals to the variable length feedback shift register, e. and timing and control means including a clock signal for providing control signals to the variable length feedback shift register, source means and counter in generating the sequence S from the data blocks (B) where the length of the sequence S is greater than the sum of the lengths of the data blocks (B).

7. The apparatus of claim 6 wherein the source means further comprises:

a. first, second and third storage means for storing the data blocks descriptive of the loading vector L, connective vector C and the length count $n$.

8. The apparatus of claim 6 wherein the variable length feedback shift register comprises:

a shift register of R stages where R is an integer selected for optimum processing of the sequence S, said shift register having an input stage to receive the signals descriptive of the loading vector L, b. a pointer register comprising R+1 stages, said pointer register adapted to receive the signals descriptive of the connective vector C, c. a second register of R stages for receiving the signals descriptive of the connective vector C, d. and feedback means interconnecting various output stages and the input of the shift register means, said feedback means including logic means for combinaing the outputs of the respective stages of the pointer register and second register in controlling the operation of the shift register to generate the sequence S in response to a shifting signal and the clock signal.

9. The apparatus of claim 8 wherein the pointer register sets the length of the shift register based upon the connective vector C stored therein.

10. The apparatus of claim 8 wherein the second register further includes logic means responsive to input signals to select the stages of the shift register to be included in the feedback path based upon the connective vector stored therein.

* * * * *